United States Patent
Beutler et al.

(10) Patent No.: US 9,487,194 B2
(45) Date of Patent: Nov. 8, 2016

(54) WEIGHT-INDEPENDENT SAFETY BRAKE

(71) Applicant: Jörg Beutler, Holzkirchen (DE)

(72) Inventors: Jörg Beutler, Holzkirchen (DE);
Thomas Günther, Lößnitz (DE)

(73) Assignee: Jörg Beutler, Holzkirchen (DE)

( * ) Notice: Subject to any disclaimer, the term of this patent is extended or adjusted under 35 U.S.C. 154(b) by 0 days.

(21) Appl. No.: 14/722,463

(22) Filed: May 27, 2015

(65) Prior Publication Data

US 2015/0344008 A1    Dec. 3, 2015

(30) Foreign Application Priority Data

May 27, 2014    (EP) ..................... 14169949

(51) Int. Cl.
| | | |
|---|---|---|
| *G06F 17/00* | (2006.01) | |
| *B60T 7/12* | (2006.01) | |
| *B60T 8/17* | (2006.01) | |
| *B60T 13/66* | (2006.01) | |
| *B60T 17/22* | (2006.01) | |

(52) U.S. Cl.
CPC ................ B60T 7/126 (2013.01); B60T 7/128 (2013.01); B60T 8/1705 (2013.01); B60T 13/665 (2013.01); B60T 17/228 (2013.01)

(58) Field of Classification Search
CPC .......... B60T 2270/413; B60T 8/1705; B60T 8/172; B60T 8/174; B60T 8/1761; B60T 8/1766; B60T 8/30; B60T 8/58; B60T 13/74; B60T 15/42; B60T 15/46; B60T 2270/30; B60L 2200/26
USPC ........................................................ 701/20
See application file for complete search history.

(56) References Cited

U.S. PATENT DOCUMENTS

2009/0171546 A1*  7/2009  Tozuka .................. B60K 31/04
                                                              701/93
2011/0098902 A1*  4/2011  Heise ...................... B60T 7/107
                                                              701/70

FOREIGN PATENT DOCUMENTS

| DE | 10245149 A1 | 4/2004 |
| DE | 10-2011-052545 | * 2/2013 |
| DE | 2011-052545 | * 2/2013 |
| DE | 102011052545 A1 | 2/2013 |
| EP | 1167142 A1 | 1/2002 |
| EP | 1230962 A1 | 8/2002 |

OTHER PUBLICATIONS

Nov. 11, 2014, Examination Report from the European Patent Office in European Patent Application No. 14169949.6, which this U.S. application claims the benefit of priority.

* cited by examiner

*Primary Examiner* — Muhammad Shafi
(74) *Attorney, Agent, or Firm* — Kolisch Hartwell, P.C.

(57) ABSTRACT

A rail-mounted car may include a braking device disposed at the car, said braking device having a brake, and a brake-control device adapted for closed-loop control over the braking operation. The braking device may have a sensor adapted for measuring braking deceleration of the car. The brake-control device may be configured such that the brake-control device adjusts the braking action of the brake as a function of the measured braking deceleration such that, via a certain braking operation, a predefined braking deceleration is achieved, without a predetermined maximum braking deceleration being exceeded.

16 Claims, 1 Drawing Sheet

WEIGHT-INDEPENDENT SAFETY BRAKE

CROSS-REFERENCE TO RELATED APPLICATION

This application claims priority to European Patent Application No. 14169949.6, filed May 27, 2014, which is hereby incorporated by reference.

BACKGROUND

In rail transport, especially in closed systems, such as roller coasters and in-house rail systems, both capacity/capacity utilisation and operational safety are of critical importance. Thus, when a multiplicity or plurality of rail-mounted cars is used in a transport system, maximum load capacities are often not exploited in full, even though a need for that would exist. This applies both to rail-mounted passenger cars, such as those used in fairground rides, and to transport systems involving cars, e.g., for transporting goods, raw materials, etc.

To ensure good capacity utilisation of a transport system while ensuring adequate safety, systems featuring external control have been developed, which measure, for example, the distances between railway cars in public rail systems and ensure minimum distances between cars, or which ensure compliance with maximum car speeds, in which connection the minimum required braking distances is a relevant input variable. However, safety buffers must be included, as, for example, the weight of a car, to an extent depending on the load, affects the braking distance under a constant braking force.

In cars, developments were primarily implemented which serve to optimise braking processes. For example, ABS systems were developed that prevent the wheels from locking during the braking operation, thereby ensuring that the braking action is optimised for ensuring the shortest-possible stopping distance. In this connection, the braking force predetermined by the car occupant is maximised.

For cars which are used in closed transport or rail systems and whose movement profile is possibly controlled from the outside, special control requirements apply. Thus, publication EP1230962 describes a brake disposed at the car wherein, before each ride commences, the laden car is weighed and the brake elements of the eddy current brake disposed at the car are correspondingly set for the entirety of the subsequent ride. However, this approach is relatively complex and inaccurate for the purpose of optimising the braking action.

SUMMARY

One or more embodiments of the present application may relate to a rail-mounted car, comprising a braking device disposed at the car, having a brake and a brake-control device for closed-loop control of the braking operation, and a method for braking a car, especially one of the cars mentioned. In particular, the present disclosure may relate to an amusement ride car, such as a roller coaster car or a transport car.

An object of one or more embodiments of the present disclosure is to provide a rail-mounted car that allows accurate control over the car movement in a rail-mounted system.

One or more embodiments of a rail-mounted car of the present disclosure may comprise a braking device disposed at the car, said braking device having a brake, and a brake-control device for open-loop and/or closed-loop control over the braking operation, wherein the braking device has a sensor for measuring braking deceleration of the car, and the brake-control device is configured such that it adjusts the braking force as a function of the measured braking deceleration such that, via a certain braking operation, a predefined braking deceleration is achieved, without a predetermined maximum braking deceleration being exceeded. The predefined braking deceleration can correspond to the predetermined maximum braking deceleration. That the latter is not exceeded can mean that this value is exceeded only slightly or not at all, for example within the limits of closed-loop control accuracy.

In one or more embodiments of the present disclosure, the braking device is designed such that, regardless of the passenger or goods load, a predetermined, especially a maximum, braking deceleration can be realized in a certain predetermined section of the circuit, wherein this maximum braking deceleration is not exceeded. The car and/or the braking device/brake-control device itself controls the deceleration in a closed-loop manner, as a result of which car- and load-specific conditions can be variable from ride to ride, without the need for the controller to be adapted to these conditions before the start of each ride.

In one or more embodiments of the present disclosure, this opens up the possibility of maximum-possible conveying capacity, as the necessary minimum distances between two successive cars can be maintained, regardless of the car weight (which may possibly vary from ride to ride). To this end, it is necessary to be able to brake the car reliably under the maximum allowable braking deceleration (the maximum allowed braking deceleration is determined with regard to statics and load, e.g., with persons). One or more embodiments of the car of the present disclosure can even have a drive or be driven externally. In the case of driven cars, closed-loop-controlled braking as per one or more embodiments of the present disclosure is to be guaranteed even should the drives fail.

In contrast, conventional braking devices generate a certain braking force that decelerates the car to an extent which depends on the car load. Thus, heavy loads are decelerated more slowly than light loads due to the greater car weight. In one or more embodiments of the present disclosure, however, a predetermined, e.g., constant braking acceleration or braking deceleration, is generated. The brake-control device is configured in the case of a constant set acceleration, such that it adjusts the braking force as a function of the measured braking deceleration, such that, via a certain braking operation, constant braking deceleration is achieved, wherein the maximum braking deceleration is not exceeded.

In summary, one or more embodiments of the present disclosure relates to a rail-mounted transport car for material, persons, fairgrounds, etc, that has a travelling braking device at the car, said braking device generating a firmly defined braking deceleration that is independent of the load and the drive. The predefined braking deceleration can be predetermined to be constant over a certain section of the circuit or to vary with the position of the car on the circuit, or to vary with the time elapsed after a specific start time (e.g., measured from the start of the ride or measured upon passing through a measurement point along the circuit), e.g., by way of a position-dependent or time-dependent function of the braking force. In addition, a braking deceleration profile can be realised that incorporates maximum allowable braking decelerations. This is a typical requirement imposed on traffic systems in which a controller takes on at least part of the braking function, whereas, for example, an ABS system is intended only to prevent the wheels from locking. The present brake controller targets the overall braking action to be achieved, which is achieved by way of acceleration-dependent closed-loop control over the braking intensity.

In one or more embodiments of the present disclosure, the closed-loop control can be based, for example, on the principle of a two-point closed-loop control: if the braking deceleration exceeds the (adjustable, predetermined) set value, the brake shoes open; if the actual value falls below this set value, the brake shoes close. The hysteresis, i.e., the range over which the actual value must change in order to effect switching, is also adjustable. Preferably, the brake shoes themselves always close with the same braking force.

In one or more embodiments of the present disclosure, the braking device has, especially, an accelerometer. This can contain, for example, a piezoelectric element, be based on the measurement of inertial forces of a test mass, on measurements of spring-mass systems, etc.

In one or more embodiments of the present disclosure, the brake-control device can be configured such that it actuates the brake such that, through alternate releasing and/or loosening and applying of the brake, braking deceleration corresponding to the predefined braking deceleration is generated. In operation, such a conceived brake is actuated, for example, released and/or loosened and then immediately closed again, upon attainment of a predetermined braking deceleration that is measured by the accelerometer, such that, overall, an approximately constant braking deceleration is achieved in the range of the predetermined, for example, maximum-allowable deceleration. Preferably, the brake-control device is configured such that it actuates the brake such that, through alternate releasing and/or loosening and closing of the brake, average braking deceleration is generated which is essentially equal to the predefined braking deceleration. That is, a maximum and a minimum braking action (closed/open brake) are generated alternately. The duration of the various braking phases (a phase is defined as being continually closed or continually open) and/or its frequency determines the resulting braking action.

In one or more embodiments of the present disclosure, the brake-control device can have a speed sensor for measuring the speed of the car and the measured speed can be transmitted to the brake-control device as a parameter for closed-loop control over the braking action of the brake. The speed sensor can be provided in addition to at least one accelerometer. The instantaneous speed can serve as a further closed-loop control input variable into the closed-loop controller. The measured speed, however, can also serve as a value for a boundary condition for the acceleration closed-loop control.

In one or more embodiments of the present disclosure, an object of the present disclosure is achieved by a rail-mounted car, comprising a braking device which is disposed at the car and which has a brake and a brake-control device for closed-loop control over the braking operation, said braking device having a sensor for measuring a speed of the car, and the brake-control device is configured such that it provides closed-loop control over the braking action of the brake as a function of the measured speed until a predetermined target speed is reached.

In one or more embodiments of the present disclosure, the brake control device can be configured such that it actuates the brake such that, through alternate releasing and/or loosening and closing of the brake, average braking deceleration is generated until the target speed is attained, which is not exceeded.

In one or more embodiments of the present disclosure, the braking device can have a brake disc which is coupled to a drive wheel of the car or to a brake wheel of the car, wherein the drive wheel and/or the brake wheel cooperates positively and/or frictionally with a corresponding element (e.g., a rack), which is disposed on at least sections of the circuit. Here, the braking is done by closing brake shoes at a brake disc connected to the drive wheel (or a separate brake wheel). The drive or brake wheel can especially enter into a positive-locking engagement (e.g., into a rack) or, in an alternative embodiment, also into a friction-locking engagement at the rail. Other braking methods are also conceivable, such as the opening and closing of brake shoes acting directly on the rail, or the pivoting in and out of permanent magnets in braking strips which are mounted to the rail and which are made from electrically conducting, but non-magnetisable material such as copper or aluminium (=eddy current brake). The element disposed at the circuit for the purpose of effecting braking can thus be a guide rail, but, in the case of a positive-locking braking device, also a rack for engaging with a gear wheel (brake wheel) which is coupled at the car side to the braking device, and the like.

In one or more embodiments of the present disclosure, the braking device has brake shoes, which act on a part disposed (so as to be stationary) at the circuit, e.g., the rail or other stationary device, or, by analogy thereto, magnets or electrically conducting, non-magnetisable materials which are used for generating an eddy current braking effect. Apart from the use of (permanent) magnets for an eddy current braking action, the use of electromagnets is conceivable which can exert a braking action either directly through magnetic forces, or which can use the eddy current effect.

In one or more embodiments of the present disclosure, a method for braking a car, especially a car as described above, comprises the steps of: a) measuring a braking deceleration of the car by way of an accelerometer; and b) closed-loop control over the braking deceleration by actuating the brake such that the braking deceleration assumes a predetermined set value.

In one or more embodiments of the present disclosure, the predetermined set value can be a constant braking deceleration (especially, a maximum-allowable braking deceleration).

In one or more embodiments of the present disclosure, closed-loop control can be effected by actuating the brake such that, through alternate releasing and/or loosening and applying of the brake, a braking deceleration corresponding to the set value is generated.

In one or more embodiments of the present disclosure, the brake can be designed as a safety brake as follows, i.e., it has the task of decelerating the car to 0 km/h in the event of a malfunction. To this end, the brake, for example, the brake shoe at the brake disc, closes with a uniform braking force. If the accelerometer registers that the maximum-allowable braking deceleration is being exceeded, the brake shoes are released until, in accordance with the set hysteresis, the deceleration is removed from the maximum value and correspondingly is below it. At that moment, the brake shoe closes again and remains closed until the accelerometer determines that the maximum braking deceleration has been reached. Then the brake shoes open. This process is repeated until the car comes to a standstill or a target speed is reached. The braking frequency is independent of whether or not the set value has been reached or exceeded, but regulates itself via the hysteresis and the current ride conditions (incline/decline, etc).

In one or more embodiments of the present disclosure, method step a) comprises especially: measurement of the speed of the car and transmission of the measured speeds to the brake-control device as a parameter (input variable) for closed-loop control over the braking action of the brake.

In one or more embodiments of the present disclosure, a further method for braking a car, especially a car as described above, comprises the steps of: a) measuring a braking deceleration of the car by way of an speed-measuring device and b) closed-loop control over the speed by actuating the brake such that a predetermined maximum braking deceleration is not exceeded. The braking deceleration can in this regard be adjusted within the closed-loop process such that it assumes a predetermined set value.

In one or more embodiments of the present disclosure, closed-loop control is preferably achieved by actuating the brake such that, through alternate releasing and/or loosening and closing of the brake, an average deceleration effect is generated until the set value is attained. Where feasible, it should not be possible to exceed the set value or, if so, at most within the limits of closed-loop-control accuracy.

In one or more embodiments of the present disclosure, especially in the case of non-driven cars, a travelling braking device, i.e., one disposed at the car, can also serve to adjust the actual speed, especially as a function of load, wind and/or friction, to a set speed (in the case of driven cars, the drive can usually be used for this purpose). To this end, in addition to the accelerometer or—in the case of low, maximum required braking forces—instead of the accelerometer, a speed sensor (e.g., based on an impeller) can be incorporated into the closed-loop control, such that braking occurs until precisely the target speed is attained. For safety reasons, the braking system can also be designed to be redundant, which means it can be provided with a plurality of brake shoes, which are each actuated by a separate sensor.

Protection is sought for one or more of these characteristics, both individually and in combinations with each other.

BRIEF DESCRIPTION OF THE FIGURES

Further advantages and characteristics of one or more embodiments of the present disclosure will become apparent from the description of one or more embodiments with reference to the figures.

DETAILED DESCRIPTION

Figure 1:
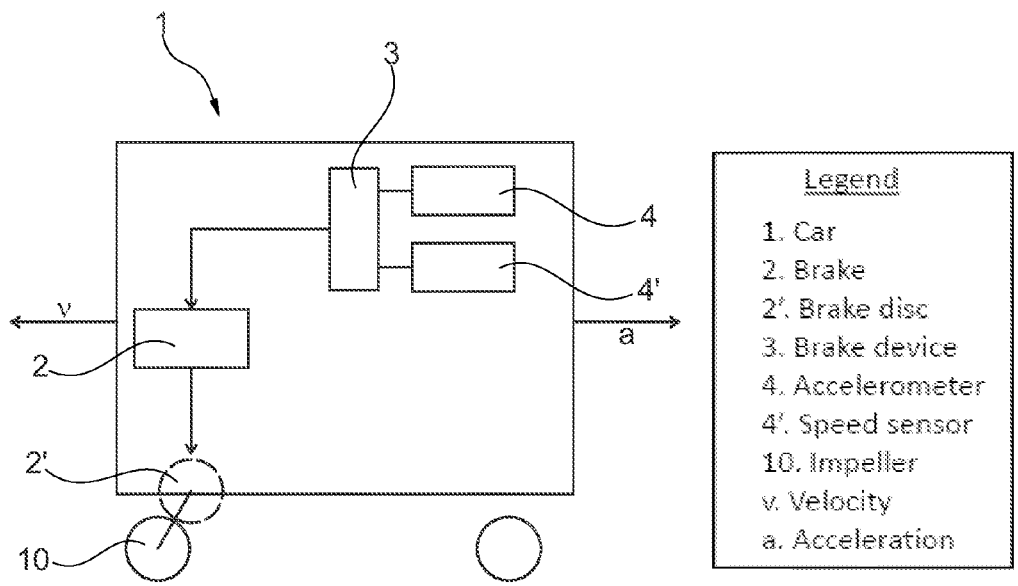
FIG. 1 is a schematic representation of an embodiment of a car of the present disclosure.

One or more embodiments of the present disclosure relate to a rail-mounted car 1 with a braking device.

The car 1 has a braking device 2, 2', 3, 4, 4', which comprises a brake 2, which, for example, through opening and closing of brake shoes (not shown), engages either directly at an impeller 10 or at a brake disc 2', which is connected/coupled to the impeller 10 or a brake wheel. The impeller or drive wheel 10 and/or the brake wheel can cooperate frictionally with the rail of the circuit and/or positively, for example, with a rack disposed on at least partial sections of the circuit. In the case of positive engagement, which supports extreme braking decelerations, the closed-loop control over the acceleration in the context of the present disclosure is especially useful, with the result that a maximum braking deceleration is not exceeded.

In addition, the braking device has a brake-control device 3, which is formed as a closed-loop control. The input variable used is a (negative) actual acceleration (=braking deceleration) measured by an accelerometer 4. The (negative) actual acceleration (=braking deceleration) is compared with a predetermined set acceleration and, through corresponding actuation of the brake 2, is controlled in a closed-loop manner such that the actual acceleration within the closed-loop control period always adapts to the set acceleration. The braking intensity and/or the braking frequency (in the case of an intermittent braking operation) is increased if the deceleration falls below the set value and reduced if the deceleration exceeds the set value.

By way of alternative to, or in addition to, an accelerometer 4, the braking device 2, 2', 3, 4, 4' can have a speed sensor 4' for measuring the speed v of the car 1. The measured speed v is transmitted to the brake-control device 3 as (additional or sole) parameter for closed-loop control over the braking action of the brake 2. Thus, the braking action can be controlled in a closed-loop manner such that a set speed profile is realized or a target end speed is reached, wherein the latter is not exceeded.

Figure 2:
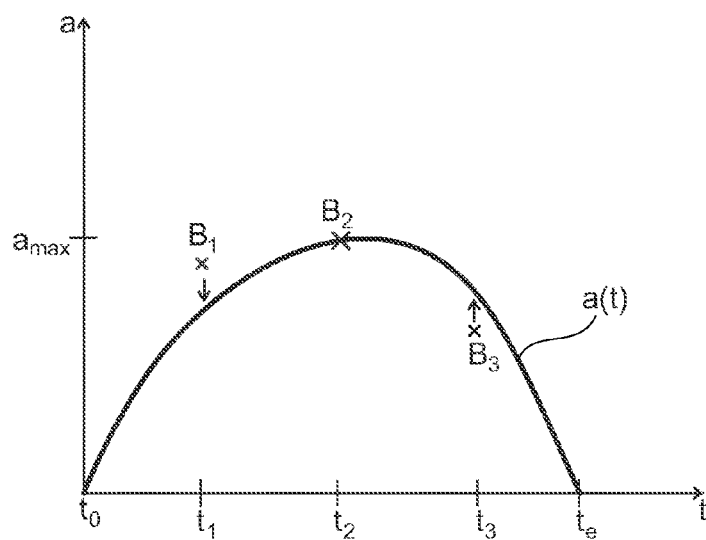
FIG. 2 is a schematic, exemplary representation of an acceleration profile.

FIG. 2 shows a predetermined set acceleration curve a(t) between a start time $t_0$ and an end time $t_e$ for a braking operation. If the measured acceleration B1 B2, B3, . . . deviates from the set value, the braking effect is adjusted such that closed-loop control in the direction of the set value occurs. Through the closed-loop control over the acceleration, weight-independent deceleration is realised, without the need for prior weight determinations.

In other examples, the set value between the times $t_0$ and $t_e$ could also be constant and, for example, amount to the maximum delay between two points on the circuit. Thus, a maximum-allowable deceleration would be realised. As a result, maximum speeds and minimal minimum distances between successive cars can be implemented, a fact which in turn supports maximum utilization of the circuit (=maximum conveying capacity).

If, as in the embodiment shown in FIG. 2, the braking effect $B_1$ at time U exceeds the maximum-allowable braking deceleration $a_{(t1)}$, the braking acceleration is reduced, i.e., the braking action thus decreases. This can be accomplished in such a way that the brake shoe opens and hence no braking action is generated until the braking action has fallen below the maximum allowable value a(U) in terms of value. If the actual braking deceleration $B_2$ at time $t_2$ corresponds to the target deceleration $a(t_2)$, the braking action is maintained. If the braking acceleration $B_3$ at time $t_3$ is less than the predetermined braking acceleration $a(t_3)$ at time $t_3$, the braking acceleration is increased, i.e., the braking action $B_3$ is increased. This can be accomplished in such a manner that the brake shoe closes and thus the maximum braking action in terms of value is generated.

A change in the braking action and/or intensity is accomplished in accordance with the type of brakes and the mode of operation of the brakes. For example, if the brake 2 is operated intermittently, e.g., by intermittent opening and closing of the brake shoes, the braking action can be adjusted via the choice of the frequency and/or duration of opening/closing. In the case of a continually acting brake, such as an eddy current brake, the braking force can be adjusted continually, e.g., by greater or lesser engagement of a brake sword with the magnetic field.

The times $t_0$ and $t_e$, which delimit a certain braking operation, can be predetermined or be determined by the braking device of one or more embodiments of the present disclosure. Thus, the times $t_0$ and/or $t_e$ can be determined by the passing of the car past certain points on the circuit. Alternatively, the times can be determined by detecting the car speed v as a function of the detected car speed v. Thus, the time $t_e$ for attainment of a certain speed can be specified and the braking operation at this time cancelled.

Alternatively, a set acceleration profile and/or a set speed profile could also be predetermined as a function of position and stored in the controller device 3.

One or more embodiments of car 1 of the present disclosure may have a braking device 2, 2', 3, 4, 4', which comprises a brake 2 which, for example, through the opening and closing of brake shoes (not shown), engages either directly at an impeller 10 or at a brake disc 2'. In addition, the braking device has a brake-control device 3, which is formed as a closed-loop control. The input variable used is an (negative) acceleration (=deceleration) a, measured by an accelerometer 4. The (negative) actual acceleration (=braking deceleration) a is compared with a predetermined set acceleration and controlled in a closed-loop manner by corresponding actuation of the brake 2 such that the actual acceleration within the closed-loop control period always adapts to the set acceleration One or more embodiments of the present disclosure may include one or more of the following concepts:

A. Rail-mounted car (1), comprising a braking device (2, 3, 4) disposed at the car (1), said braking device having a brake (2), and a brake-control device (3) for closed-loop control over the braking operation, characterised in that the braking device has a sensor (4) for measuring braking deceleration of the car (1), and the brake-control device (3) is configured such that it adjusts the braking action of the brake (2) as a function of the measured braking deceleration such that, via a certain braking operation, a predefined braking deceleration is achieved, without a predetermined maximum braking deceleration being exceeded.

B. Car (1) according to Paragraph A, characterised in that the brake-control device (3) is configured such that it adjusts the braking force as a function of the measured braking deceleration such that, via a certain braking operation, a constant braking deceleration is achieved.

C. Car (1) according to any of the preceding Paragraphs, characterised in that the sensor (4) is an accelerometer.

D. Car (1) according to any of the preceding Paragraphs, characterised in that the brake-control device (3) is configured such that it actuates the brake (2) such that, through alternate releasing and/or loosening and applying of the brake (2), braking deceleration corresponding to the predefined braking deceleration is generated.

E. Car (1) according to any of the preceding Paragraphs, characterised in that the brake-control device (3) is configured such that it actuates the brake (2) such that, through alternate releasing and/or loosening and applying of the brake (2), an average braking deceleration is generated which is essentially equal to the predefined braking deceleration.

F. Car (1) according to any of the preceding Paragraphs, characterised in that the brake-control device (3) has a speed sensor (4') for measuring the speed of the car (1) and the measured speed is transmitted to the brake-control device (3) as a parameter for closed-loop control over the braking action of the brake (2).

G. Rail-mounted car (1), comprising a braking device (2, 3, 4') which is disposed at the car (1) and has a brake and a brake-control device (3, 4') for closed-loop control over the braking operation, characterised in that the braking device (2, 3, 4') has a sensor (4') for measuring a speed of the car (1), and the brake-control device (3) is configured such that it adjusts the braking action of the brake (2) as a function of the measured speed until a predetermined target speed is achieved, without a predetermined maximum speed being exceeded.

H. Car (1) according to Paragraph G, characterised in that the brake-control device (3) is configured such that it actuates the brake (2) such that, through alternate releasing and/or loosening and closing of the brake (2), average braking deceleration is generated until the target speed is attained, wherein the latter is not exceeded.

I. Car (1) according to any of the preceding Paragraphs, characterised in that the braking device (2, 3, 4') has a brake disc (2') which is coupled to a drive wheel (10) of the car (1) or to a brake wheel of the car (1), wherein the drive wheel (10) and/or the brake wheel cooperates positively and/or frictionally with a corresponding element, which is disposed on at least sections of the circuit.

J. Car (1) according to any of the preceding Paragraphs, characterised in that the braking device (2, 3, 4') comprises brake shoes, which act on a fixed part disposed at the circuit and/or comprises electromagnets and/or magnets for generating an eddy current braking effect.

K. Method for braking a car (1), according to any of the preceding Paragraphs, comprising the steps of: Measurement of a braking deceleration of the car (1) by way of an accelerometer (4); Closed-loop control over the braking deceleration by actuating the brake (2) such that the braking deceleration assumes a predetermined set value, without a predetermined maximum braking deceleration being exceeded.

L. Method according to Paragraph K, characterised in that the predetermined set value is a constant braking deceleration.

M. Method according to Paragraphs K or L, characterised in that, the closed-loop control is effected by actuating the brake (2) such that, through alternate releasing and/or loosening and applying of the brake (2), a braking deceleration corresponding to the set value is generated.

N. Method according to Paragraphs K to M, characterised in that the method step a) comprises: Measurement of the speed of the car (1) and transmission of the measured speeds to the brake-control device (3) as a parameter for closed-loop control over the braking action of the brake (2).

O. Method for braking a car, especially a car (1) according to any of the preceding Paragraphs, comprising the steps of: a) Measurement of the speed of the car (1) by way of a speed-measuring device; b) Closed-loop control over the speed by actuating the brake (2) such that a predetermined maximum braking deceleration is not exceeded.

P. Method according to Paragraph O, characterised in that the closed-loop control is achieved by actuating the brake (2) such that, through alternate releasing and/or loosening and closing of the brake (2), an average braking action is generated until the set value is attained, without a maximum predetermined braking deceleration being exceeded.

What is claimed is:

1. A rail-mounted car, comprising: a braking device disposed at the car, said braking device having a brake, and a brake-control device adapted for closed-loop control over the braking operation,
wherein, the braking device has a sensor adapted for measuring braking deceleration of the car,
the braking action of the brake as a function of the measured braking deceleration such that, via a certain braking operation, a predefined braking deceleration is achieved, without a predetermined maximum braking deceleration being exceeded, and wherein when the braking deceleration exceeds the maximum-allowable braking deceleration, the braking deceleration is reduced, and when the braking deceleration corresponds to a target deceleration, the braking action is maintained, and when the braking deceleration is less than an minimum-allowable braking acceleration, the braking deceleration is increased.

2. The car in accordance with claim 1, wherein the brake-control device is configured such that the brake-control device adjusts the braking force as a function of the measured braking deceleration such that, via a certain braking operation, a constant braking deceleration is achieved.

3. The car in accordance with claim 1, wherein the sensor is an accelerometer.

4. The car in accordance with claim 1, wherein the brake-control device is configured such that the brake-control device actuates the brake such that, through alternate releasing and/or loosening and applying of the brake, braking deceleration corresponding to the predefined braking deceleration is generated.

5. The car in accordance with claim 1, wherein the brake-control device is configured such that the brake-control device actuates the brake such that, through alternate releasing and/or loosening and applying of the brake, an average braking deceleration is generated which is substantially equal to the predefined braking deceleration.

6. The car in accordance with claim 1, wherein the brake-control device has a speed sensor adapted for measuring the speed of the car and the measured speed is transmitted to the brake-control device as a parameter for closed-loop control over the braking action of the brake.

7. A rail-mounted car, comprising: a braking device which is disposed at the car and has a brake and a brake-control device adapted for closed-loop control over the braking operation, wherein the braking device has a sensor adapted for measuring a speed of the car, and the brake-control device is configured such that the brake-control device adjusts the braking action of the brake as a function of the measured speed of the car by the sensor until a predetermined target speed is achieved, without a predetermined maximum speed being exceeded, wherein the braking occurs until precisely the target speed is attained.

8. The car in accordance with claim 7, wherein the brake-control device is configured such that the brake-control device actuates the brake such that, through alternate releasing and/or loosening and closing of the brake, average braking deceleration is generated until the target speed is attained, wherein the latter is not exceeded.

9. The car in accordance with claim 7, wherein the braking device has a brake disc which is coupled to a drive wheel of the car or to a brake wheel of the car, wherein the drive wheel and/or the brake wheel enters into a positive-locking engagement and/or enters into a friction-locking engagement with a corresponding element, which is disposed on at least sections of the circuit.

10. The car in accordance with claim 7, wherein the braking device comprises one or more brake shoes, which act on a fixed part disposed at the circuit and/or comprises electromagnets and/or magnets configured to generate an eddy current braking effect.

11. A method for braking a car, comprising the following steps:

providing a rail-mounted car having a braking device disposed at the car, said braking device having a brake, and a brake-control device which adjusts the braking action of the brake wherein the break-control device performs the steps of:

automatically measuring of a braking deceleration of the car with an accelerometer; and automatically controlling, by closed-loop control over the braking deceleration, by actuating the brake such that the braking deceleration assumes a predetermined set value, without a predetermined maximum braking deceleration being exceeded; and wherein, when the braking deceleration exceeds the maximum-allowable braking deceleration, the braking deceleration is reduced, and when the braking deceleration corresponds to a target deceleration, the barking action is maintained, and when the braking deceleration is less than a minimum-allowable braking deceleration, the barking deceleration is increased.

12. The method in accordance with claim 11, wherein the predetermined set value is a constant braking deceleration.

13. The method in accordance with claim 11, further comprising affecting the closed-loop control by actuating the brake such that, through alternate releasing and/or loosening and applying of the brake, a braking deceleration corresponding to the set value is generated.

14. The method in accordance with claim 11, further comprising measuring the speed of the car and transmission of the measured speeds to the brake-control device as a parameter for closed-loop control over the braking action of the brake.

15. A method for braking a car, comprising the following steps:

providing a rail-mounted car having a braking device disposed at the car, said braking device having a brake, and a brake-control device which adjusts the braking action of the brake wherein the brake-control device performs the steps of:

automatically measuring the speed of the car with a speed-measuring device; and automatically controlling, by closed-loop control over the speed, by actuating the brake such that a predetermined maximum braking deceleration is not exceeded; and wherein, when the braking deceleration exceeds the maximum-allowable braking deceleration, the braking deceleration is reduced, and when the braking deceleration corresponds to a target deceleration, the barking action is maintained, and when the braking deceleration is less than a minimum-allowable braking deceleration, the barking deceleration is increased.

16. The method in accordance with claim 15, wherein the closed-loop control is achieved by actuating the brake such that, through alternate releasing and/or loosening and closing of the brake, an average braking action is generated until the set value is attained, without a maximum predetermined braking deceleration being exceeded.

* * * * *